June 27, 1933. F. STEIGENBERGER 1,915,454
DEVICE FOR OPENING THE MOUTH OF AN ANIMAL AND HOLDING IT OPEN
Filed Jan. 11, 1930

Inventor:
Friedrich Steigenberger
Attorney:

Patented June 27, 1933

1,915,454

UNITED STATES PATENT OFFICE

FRIEDRICH STEIGENBERGER, OF ULM-ON-THE-DONAU, GERMANY

DEVICE FOR OPENING THE MOUTH OF AN ANIMAL AND HOLDING IT OPEN

Application filed January 11, 1930, Serial No. 420,190, and in Belgium October 23, 1929.

My present invention has for its object to provide an improved device for opening the mouth of an animal, without danger and without hurting such animal, for instance in view of examining certain organs, introducing medicaments, removing alien bodies and the like.

Known devices of this type comprise two oblong members located substantially in the same plane and pivotally connected together at one end thereof. Said members after having been inserted in a flat state into the mouth of the animal with the pivotal connection turned outwardly, will be progressively opened or spaced by a traction exerted on a slidable cross-bar acting on one or both members.

According to my invention I provide pivotal struts connecting the foremost end of one of said oblong members to the other oblong member, in such a way that said oblong members may be introduced into the mouth lying flat one upon the other, and I provide means operating said pivotal struts whereby said oblong members are forcibly pivoted apart inside the mouth and are maintained rigidly opened against all attempts of the animal to shut its mouth.

By providing a pivotal strut connection between the two oblong members I provide a much more easy and efficient means for forcing said members apart than by sliding a cross-bar between said members, towards their connected ends, and I obviate the possibility of the opened out ends of said oblong members being bent by the pressure against the palate of the animal.

My invention may be carried to practical effect in various ways and by way of example I have illustrated a number of practical embodiments in the accompanying drawing, wherein each figure shows a perspective view of a distinct embodiment.

The device in each embodiment comprises a lower oblong member $a$ formed of a rigid substantially U-shaped wire or rod, having its ends bent in the shape of eyes. Rotatably supported in the latter by its ends substantially curved outwardly at right angles is the upper member $b$ which is a little shorter and narrower than the member $a$. The ends of the member $b$ are bent in the shape of eyes $f$ extended by branches parallel to the sides of the member $b$ either upwardly or downwardly, said extensions being provided with handles $g$.

Arranged between said members $a$ and $b$ is a pivotal strut adapted to be operated by means of a chain $h$. Said pivotal strut $c'$ will automatically raise the pivotally connected member $b$ against the palate of the animal by a traction on the chain $h$ or move said member back to its initial position. Such movement is facilitated by the raising or lowering of the lateral handles $g$. By catching the chain $h$ link by link in a pin $e$ formed on the member $a$, the latter will be held in position.

Figure 1:
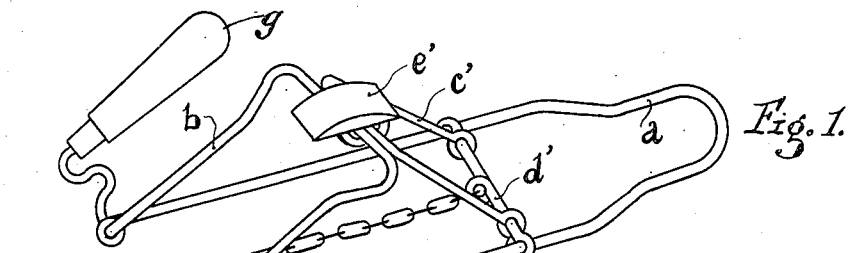
Fig. 1 is a view of an apparatus according to my invention for opening the mouth of an animal.
Figure 2:
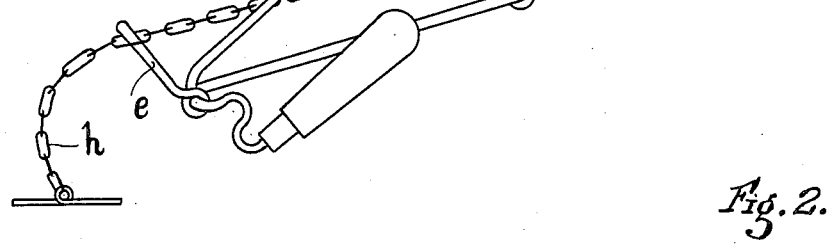
Fig. 2 shows a different embodiment of a similar apparatus provided with a plate bearing against the palate of the animal.
Figure 3:
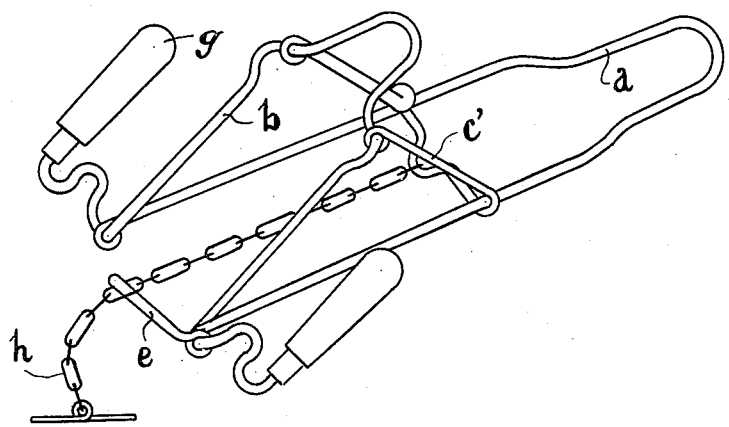
Fig. 3 is a view of another embodiment.

The embodiments shown in Figs. 1, 2 and 3 comprise supporting members $c'$ arranged substantially in the centre of the device and enabling the mouth of the strongest animal to be opened, at the same time preventing the devices from being disengaged from the animal's mouth. In these views the same characters already used previously designate corresponding parts. The member $b$ is enlarged in order to be prevented from dropping below the member $a$.

In Fig. 1 a cross bar $d'$ is slidably mounted on the member $a$ and on said cross bar the supporting member $c'$ is mounted rotatably. A palate supporting plate $e'$ is loosely mounted on the supporting member $c'$ and transverse portion of member $b$. In Fig. 2 the member $b$ has an extension, forming a substitute for said plate $e'$. Moreover the supporting member $c'$ is made integral with the cross bar $d'$, pivotally connected to the member $b$ and slidable on the member $a$.

In Fig. 3 the supporting member $c'$ is not slidable on the member $a$ but pivoted on same and pivotally connected to the palate engaging member $b$.

These various devices should be inserted in a flat state in the animal's mouth and held in place by means of a cord extending through both eyes or loops $f$ on the member $b$ and tied around the horns of the animal, whereupon the animal's mouth will be opened by simultaneously spacing the members $a$ and $b$ apart from each other in the manner described and securing said members in the operative positions. The member $a$ serves to tickle or excite the animal whilst the member $b$ will open its mouth.

By this operation the animal will be submitted to excitation forcing it to open the mouth and its throat will then be enlarged so as to produce the collapsing of the stomach and expelling of nondigested food, at the same time enabling the operator to insert his arm through the device for pouring medicaments into the animal's throat, examining the latter, extracting alien bodies from same and exploring the animal's stomach.

Having now fully described my said invention, what I claim and desire to secure by Letters Patent, is:

1. A device for opening the mouth of an animal comprising in combination two members pivotally connected to each other by the one end and adapted to be introduced into the mouth of the animal the other end foremost, pivotal strut means connecting said foremost ends of the two members, and means for operating said pivotal strut means whereby said two members can be forcibly pivoted apart inside the mouth and maintained rigidly in such position.

2. A device for opening the mouth of an animal comprising in combination two members pivotally connected together at one end, the lower member being longer than the upper member and adapted to be inserted into the mouth of the animal, the upper member being adapted to be raised against the animal's palate, two lateral handles integral with one of said members, loops for attaching the device to the animal's head, a cross member slidably arranged on the lower member and movable thereon from the rear towards the pivotal connection between said lower and upper members, a U-shaped part pivoted on said cross member and pivotally connected to the upper member, and means for displacing said cross member on the lower member towards the pivotal connection between said lower and upper members, substantially as set forth.

3. A device for opening the mouth of an animal comprising in combination two members pivotally connected together at one end, the lower member being longer than the upper member and adapted to be inserted into the mouth of the animal, the upper member being adapted to be raised against the animal's palate, two lateral handles integral with one of said members, loops for attaching the device to the animal's head, a U-shaped cross member slidably arranged on the lower member and pivotally connected to the upper member, and means for displacing said cross member on the lower member towards the pivotal connection between the lower and upper members, substantially as set forth.

4. A device for opening the mouth of an animal comprising in combination two members pivotally connected together at one end, the lower member being longer than the upper member and adapted to be inserted into the mouth of the animal, the upper member being adapted to be raised against the animal's palate, two lateral handles integral with one of said members, loops for attaching the device to the animal's head, a U-shaped cross member pivoted on the lower member and pivotally connected to the upper member, and means for effecting the rotation of said cross member on the lower member to raise the upper member and open the animal's mouth, substantially as set forth.

5. A device for opening the mouth of an animal comprising in combination two members pivotally connected together at one end, the lower member being longer than the upper member and adapted to be inserted into the mouth of the animal, the upper member being adapted to be raised against the animal's palate, two lateral handles integral with one of said members, loops for attaching the device to the animal's head, a U-shaped cross member pivoted on the lower member and pivotally connected to the upper member, a chain attached to said pivoted cross member for rotating same on the lower member, and a suitable catch on one of said main members for holding said chain and cross member in operative positions, substantially as set forth.

6. A device for opening the mouth of an animal comprising in combination two members pivotally connected together at one end, the lower member being longer than the upper member and adapted to be inserted into the mouth of the animal, the upper member being adapted to be raised against the animal's palate, two lateral handles integral with one of said members, loops for attaching the device to the animal's head, a U-shaped cross member pivoted on the lower member and pivotally connected to the upper member, a palate supporting plate pivoted on the upper member, and means for effecting the rotation of the said cross member on the lower member to raise the upper member and open the animal's mouth, substantially as set forth.

7. A device for opening the mouth of an animal comprising in combination two members pivotally connected together at one end, the opposite end of each member being free and adapted to be introduced into the mouth of an animal, strut means pivotally operative in association with the second mentioned ends of the members, and means for applying force to said strut means whereby the inner ends of said two members are moved apart inside the mouth.

FRIEDRICH STEIGENBERGER.